United States Patent [19]

Denny

[11] 4,114,681

[45] Sep. 19, 1978

[54] THERMOSTAT, METHOD OF OPERATING SUCH ELECTRICAL CIRCUIT AND METHOD OF HEATING A TEMPERATURE SENSING MEANS

[75] Inventor: Dann W. Denny, Morrison, Ill.

[73] Assignee: General Electric Company, Fort Wayne, Ind.

[21] Appl. No.: 750,280

[22] Filed: Dec. 13, 1976

[51] Int. Cl.² ............................................. G05D 23/30
[52] U.S. Cl. ...................................... 165/26; 62/202; 236/68 B
[58] Field of Search .................. 165/26, 27; 236/68 B, 236/1 C; 62/202; 337/104, 377

[56] References Cited

U.S. PATENT DOCUMENTS

| | | | |
|---|---|---|---|
| 2,969,916 | 1/1961 | Shequen | 165/26 X |
| 3,047,273 | 7/1962 | Scarr, Jr. | 165/26 |
| 3,087,032 | 4/1963 | Fleury | 200/122 |
| 3,154,654 | 10/1964 | Woods et al. | 200/122 |
| 3,993,120 | 11/1976 | Iberg et al. | 165/26 |

*Primary Examiner*—William E. Wayner
*Attorney, Agent, or Firm*—Joseph E. Papin

[57] ABSTRACT

A thermostat adapted for operation in a heating mode and a cooling mode so as to regulate the temperature of a space in which the thermostat may be located. The thermostat has means adjustably movable therein toward selected positions respectively indicative of a selected temperature of the space and operable in the selected positions for sensing the temperature of the space. A pair of means are disposed in heat transfer relation with the sensing means and energized during the heating mode operation and the cooling mode operation of the thermostat for supplying anticipation heat to the sensing means, respectively. Means is disposed in heat transfer relation with the sensing means and energized during the heating mode operation of the thermostat for transferring biasing heat to the sensing means so as to supplement the anticipation heat supplied to the sensing means by one of the supplying means upon the energization thereof during the heating mode operation of the thermostat.

A method of operating a thermostat, an electrical circuit, and a method of heating a temperature sensing means of a thermostat are also disclosed.

30 Claims, 7 Drawing Figures

THERMOSTAT, METHOD OF OPERATING SUCH ELECTRICAL CIRCUIT AND METHOD OF HEATING A TEMPERATURE SENSING MEANS

BACKGROUND OF THE INVENTION

This invention relates generally to control devices and in particular to a thermostat, a method of operating a thermostat, an electrical circuit, and a method of heating a temperature sensing means of a thermostat.

In the past, various types of thermostats were utilized for controlling the operations of a heating system and a cooling system associated with a given space so as to regulate the temperature of the space. One of the past thermostats was of the dual or automatic type having a pair of temperature sensing devices for generally controlling the operations of the heating system and the cooling system, respectively, and such temperature sensing devices were respectively actuated by a pair of temperature setting indicators which were manually movable to select a desired temperature for the space. For instance, if heat was desired in the space, the heating temperature setting indicator was manually moved to the selected desired temperature setting for the space, and the temperature sensing device associated with the heating temperature setting indicator was actuated to a position in which the energization of the heating system was controlled so as to thermostatically regulate the temperature of space. Of course, in response to the temperature setting manual movement of the heating temperature setting indicator, the cooling temperature setting indicator and the cooling temperature sensing device associated therewith were driven to a position in which the cooling temperature sensing device was essentially incapacitated so that it could not effect actuation of the cooling system in response to the temperature of the space sensed by the cooling temperature sensing device. While these dual thermostats may have many salient features, it is believed that a disadvantageous or undesirable features thereof may reside in the adverse economics of providing a pair of temperature sensing devices and temperature setting indicators for respectively controlling the operation of the heating system and the cooling system.

Also in the past, thermostats of the manual type were also provided to control the heating system and the cooling system. In the past manual thermostats, means was provided to enable either the heating system or the cooling system, and a single temperature sensing device was associated with a temperature setting indicator which was manually moved to select the desired temperature of the given space. Of course, the aforementioned single temperature sensing device was responsive to the temperature in the space to control the energization of the enabled one of the heating system and the cooling system. Many of the past manual thermostats were provided with a universal anticipation heater for the temperature sensing device thereof, and it is believed that one of the disadvantageous or undesirable features of such universal anticipation heating schemes was that the cycle rate was lower in the cooling mode operation of such past manual thermostats having a universal anticipation heater than in the heating mode operation thereof by a fixed ratio. Of course, since the cycle rate affects the life of valuable system components, such as a heat pump compressor for instance, it is desirable to have as high a cycle rate that will provide adequate comfort and yet as low a cycle rate that will maximize the life of the component. Furthermore, another disadvantageous or undesirable feature of the past manual thermostats is believed to be that the control point or temperatures of the space would gradually rise as the demand for heat or duty cycle was required and then the space temperature would drop upon the transition of the such past thermostat from the heat mode to the cool mode by operation of its heat or cool system selection switch.

SUMMARY OF THE INVENTION

Among the several objects of the present invention may be noted the provision of an improved thermostat, an improved method of operating a thermostat, an improved electrical circuit, and an improved method of heating a temperature responsive means of a thermostat which overcome the above discussed disadvantageous features, as well as others, of the prior art thermostats; the provision of such thermostat, electrical circuit and methods which optimize the cycle rate in both heating and cooling mode operation; the provision of such thermostat, electrical circuit and methods in which the duty life of system components are maximized; the provision of such thermostat, electrical circuit and methods having separate means for supplying anticipation heat during the heating mode operation and the cooling mode operation of the thermostat, respectively; the provision of such thermostat, electrical circuit and methods in which a means for supplying housing heat and a means for supplying anticipation heat to a temperature sensing means of the thermostat are respectively deenergized when a cooling system energizing branch of an electrical circuit of the thermostat is completed; the provision of such thermostat, electrical circuit and methods having means for generating heat which supplements that of a means for supplying anticipation heat to a temperature sensing means only during the heating mode operation of the thermostat; the provision of such thermostat, electrical circuit and methods in which the controlling temperature in the cooling mode operation of the thermostat may be set generally even with or above the controlling temperature of the heating mode operation of the thermostat; and the provision of a thermostat which is simplified in design, economical to manufacture, and easily assembled. These as well as other objects and advantageous features of the present invention will be in part apparent and in part pointed out hereinafter.

In general, a thermostat in one form of the invention is adapted for operation in a heating mode and a cooling mode so as to regulate the temperature of a space in which the thermostat may be located. In this thermostat, means is adjustably movable toward selected positions respectively indicative of a selected temperature of the space and operable in the selected positions for sensing the temperature of the space, and a pair of means are disposed in heat transfer relation with the sensing means and energized during the heating mode operation and the cooling mode operation of the thermostat for supplying anticipation heat to the sensing means respectively. Means is disposed in heat transfer relation with the sensing means and energized continuously during the heating mode operation of the thermostat for transferring biasing heat to the sensing means so as to supplement the anticipation heat supplied to the sensing means by one of the supplying means upon the energization thereof during the heating mode operation of the thermostat.

Also in general and in one form of the invention, a thermostat is provided for regulating the temperature of a space in which the thermostat may be located. In this thermostat, an electrical circuit has a heating branch and a cooling branch adapted for selective energization, and a pair of means is connected in the heating branch and the cooling branch for supplying anticipation heat during the selective energization of the heating branch and the cooling branch, respectively. Means is connected in the heating branch for continuously generating biasing heat only during the selective energization of the heating branch.

Further in general and in a thermostat adapted for operation in a heating mode and a cooling mode and having means for sensing the temperature of a given space in which the thermostat may be located, there is provided a method in one form of the invention for heating the temperature sensing means. This method includes the steps of: supplying anticipation heat to the temperature sensing means during the heating mode operation and the cooling mode operation of the thermostat, respectively; and, generating biasing heat continuously to the temperature sensing means during the heating mode operation of the thermostat.

Still further and in general, a method in one form of the invention is provided for operating a thermostat having a heating circuit and a cooling circuit and also having means for sensing the temperature of a given space in which the thermostat may be located. This method includes the steps of: enabling one of the heating circuit and the cooling circuit; energizing a pair of means in the heating circuit and the cooling circuit for supplying anticipation heat to the temperature sensing means upon the enablement of the heating circuit and the cooling circuit in the enabling step, respectively; and energizing means in the heating circuit for continuously generating a biasing heat supplemental to the anticipation heat supplied to the temperature sensing means by one of the supplying means energized in the first energizing step when the heating circuit is enabled.

In general and in one form of the invention, an electrical circuit is provided for a thermostat having temperature sensing means movable therein in response to a sensed temperature of a given space in which the thermostat may be located. The electrical circuit has a heating branch circuit and a cooling branch circuit. A pair of means are connected in the heating branch circuit and the cooling branch circuit for supplying anticipation heat to the temperature sensing means when the heating branch circuit and the cooling branch circuit are enabled, respectively. Means is connected in the heating branch circuit for continuously transmitting a biasing heat to the temperature sensing means upon the enablement of the heating branch circuit.

BRIEF DESCRIPTION OF THE DRAWINGS

Corresponding reference characters indicate corresponding parts throughout the several views of the drawings.

The exemplifications set out herein illustrate preferred embodiments of the invention in one form thereof, and such exemplifications are not to be construed as limiting in any manner the scope of the invention.

DETAILED DESCRIPTION OF THE PREFERRED EMBODIMENTS

Figure 1:
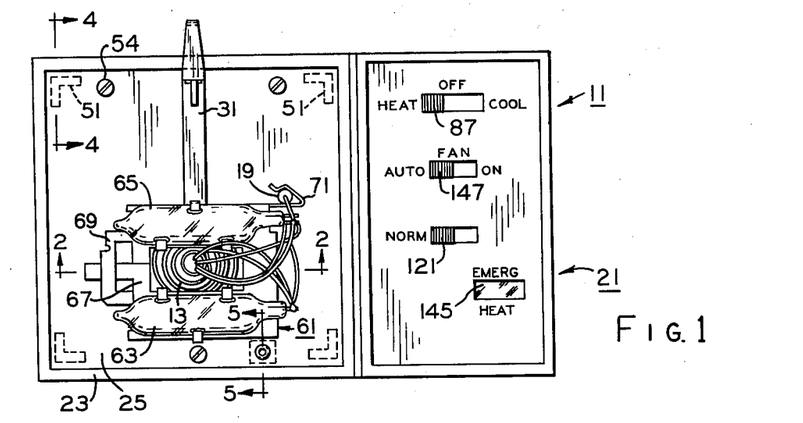
FIG. 1 is a plan view of a thermostat in one form of the invention with a cover of the thermostat housing removed for clarity and which, in conjunction with the schematic diagram of an electrical circuit in one form of the invention set out in FIG. 6, teach principles of a method of operating a thermostat and a method of heating a temperature responsive means of a thermostat respectively in one form of the invention.
Figures 2, 3, 6:
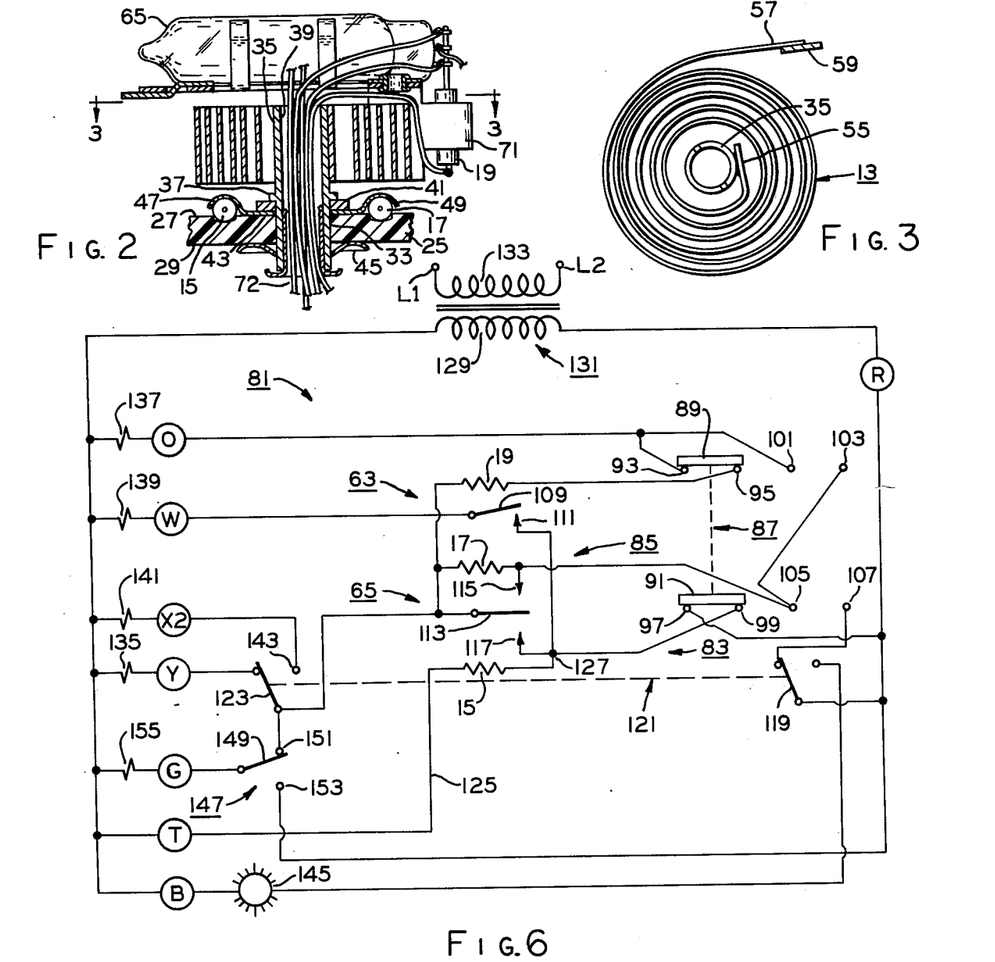
FIG. 2 is a sectional view taken along the line 2—2 of FIG. 1.
FIG. 3 is a sectional view taken along line 3—3 of FIG. 2.
FIG. 6 is a schematic diagram illustrating the electrical circuit of the thermostat of FIG. 1 for connection in a heating and cooling system.
Figure 4:
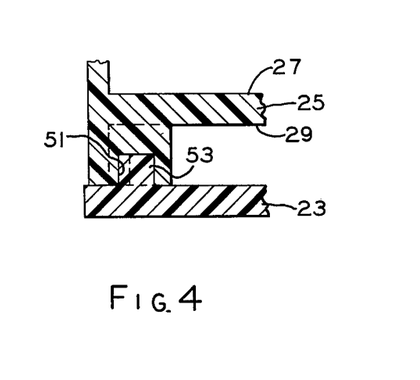
FIG. 4 is a sectional view taken along line 4—4 of FIG. 1.

Referring in general to the drawings, a thermostat 11 in one form of the invention is adapted for operation in a heating mode and a cooling mode so as to regulate the temperature of a given space in which the thermostat may be located (FIGS. 1-4). Means, such as a bimetal element 13 for instance, is adjustably movable in thermostat 11 toward selected or adjusted positions respectively indicative of or correlated with a selected temperature of the space and is operable in the selected positions for sensing the temperature of the space (FIGS. 1 and 2). A pair of means, such as resistors 17, 19 or the like, are disposed in heat transfer relation with the sensing means or bimetal element 13 and are energized during the heating mode operation and the cooling mode operation of thermostat 11 for supplying anticipation heat to the bimetal element, respectively (FIGS. 2 and 4). Means, such as a resistor 15 or the like, is also disposed in heat transfer relation with bimetal element 13 and is continuously energized during the heating mode operation of thermostat 11 for transferring biasing heat to the bimetal element so as to supplement the anticipation heat supplied to the bimetal element by one of the supplying means or resistor 19 upon the energization thereof during the heating mode operation of the thermostat (FIGS. 2 and 4).

More particularly and with specific reference to FIGS. 1 and 2, thermostat 11 is provided with a casing 21 having a plurality of casing members, such as a base member 23, an intermediate member 25, and a cover member (not shown), predeterminately disposed with respect to each other. Intermediate member 25 is carried on base member 23 adjacent thereto and has upper and lower generally planar faces 27, 29. The cover member is carried on the intermediate member adjacent its upper face 27 and contains temperature setting indicia for association with a temperature setting indicator, such as a selector or arm 31, which is manually movable within a predetermined range of temperature settings so as to set the preselected temperature of the given space, as discussed hereinafter. An opening 33 is provided through casing intermediate member 25 between its upper and lower faces 27, 29.

Means, such as a post 35, is rotatably disposed in thermostat 11 for mounting both bimetal element 13 and indicating arm 31, and the post includes a generally annular radically extending shoulder, such as an abutment or bearing surface 37. A pivoted or bifurcated end 41 of indicating arm 31 is disposed in gripping engagement about post 35 between shoulder 37 thereof and a washer-line tab or bearing 43 through which the post extends. Bearing 43 is disposed on upper surface 27 of intermediate casing member 25 about opening 33 therein, and post 35 is rotatably disposed in the opening extending past lower face 29 of the intermediate casing member. Retaining means, such as a spring washer 45 or the like, is slidably and rotatably received in engagement with lower face 29 of intermediate casing member 25 about opening 33 therein and in resilient wedging or releasable engagement with the lower end portion of post 35 thereby to maintain the post against displacement movement generally axially of the opening. Bearing 43 is provided with a pair of integral tab portions 47, 49 having free ends generally formed into an arcuate or off-set section in which resistors or heat anticipators 15, 17 are retained so as to be disposed or positioned generally adjacent bimetal element 13 in heat supplying or transfer relation therewith.

A plurality of guide or positioning slots or apertures 51 are provided in intermediate casing member 25 generally at the corners thereof intersecting with lower face 29, and a plurality of extension means, such as bosses 53 or the like, are integrally provided in casing base member 23 extending from the upper face thereof so as to be received in guiding and positioning engagement with the guide apertures when the casing intermediate and base member are assembled together, FIGS. 1 and 4. Suitable means, such as a plurality of screws 54 for instance, may be releasably secured between base and intermediate casing members 23, 25 so as to releasably maintain them against separation from their assembled positions, and the screws may also be utilized as electrical terminals for thermostat 11, if desired.

Bimetal element 13 is mounted in thermostat 11 so as to be conjointly movable with indicating arm 31 and post 35 toward respective ones of its selected of adjusted positions for sensing the temperature of the space (not shown) in which the thermostat may be located. Referring now also to FIG. 3, bimetal element 13 comprises a strip of bimetal material of any suitable type wound into a permanent generally spiral shape or configuration and having radially inner and outer ends 55, 57. While bimetal element 13 having a generally spiral configuration is shown for purposes of disclosure, it is contemplated that temperature sensing means other than bimetal element 13 may be employed within the scope of the present invention so as to meet the objects and advantageous feature thereof. Inner end 55 is attached by suitable means, such as a spot weld for instance (not shown), to post 35 so that an edge of the bimetal element is spaced adjacent upper face 27 of intermediate casing member 25 as well as resistors 15, 17. Outer end 57 of bimetal element 13 is also attached by suitable means, such as a spot weld for instance (not shown), to a depending tab 59 of a cradle or bracket 61 so that the cradle is conjointly movable with the bimetal element both to its adjusted positions and also in response to temperatures sensed by the bimetal element causing movement therof. Of course, bimetal element 13 is conjointly rotatable with post 35 to a respective one of the adjusted positions of the bimetal element in response to an operator applied force on selector arm 31 which moves it to a set point temperature constituting the preselected temperature desired for the given space and effects conjoint rotation of the post with the selector arm. If greater detail is desired with respect to the mechanical construction of thermostat 11 as set forth hereinabove, reference may be had to copending application Ser. No. 750,277 filed Dec. 13, 1976 which is incorporated herein by reference.

Cradle 61 is provided for supporting a pair of switches or switching devices 63, 65 which may be of the well known mercury type for instance, and as discussed in greater detail hereinafter switch 63 is single pole, single throw while switch 65 is single pole, double throw. Cradle 61 includes a pair of pivotally mounted legs 67, 69 to which switches 63, 65 are respectively secured, and the legs are pivotally or adjustably movable with respect to each other to establish or define the predetermined switch points of the switches. Of course, when the desired switch points of switches 63, 65 are determined by pivoting legs 67, 69 with respect to each other, the legs are interconnected by suitable means, such as soldering or the like (not shown) thereby to prevent further pivotal displacement movement of the legs in order to maintain the predetermined switch points of the switches. While cradle 61 is shown for purposes of disclosure, it is contemplated that cradle other than cradle 61 may be employed in association with sensing means 13 within the scope of the present invention so as to meet the objects and advantageous features thereof. Tab 59 which is mounted to outer end 57 of bimetal 13, as previously mentioned, may be integrally formed with either of legs 63, 65, and a bent-over extension 71 is integrally formed on tab 59 for retaining resistor 19. If the construction and operation of cradle 61 is desired in greater detail reference may be had to application Ser. No. 750,279 filed Dec. 13, 1976 (G.E.) which is incorporated by reference herein.

Figure 5:
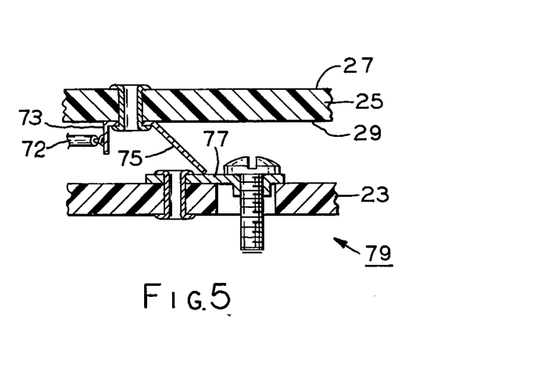
FIG. 5 is a sectional view taken along line 5—5 of FIG. 1.

A plurality of circuit leads 72 have one of their ends connected with the respective contacts of switches 63, 65, and the leads extend or pass through bore 39 of post 35 so that the other ends of the leads are connected with respective ones of a plurality of busses 73, or other circuit components or the like, FIGS. 2 and 5. Busses 73 may be attached by suitable means to lower face 29 of intermediate casing member 25, as shown in FIG. 5. At least some of busses 73 have integrally formed resilient means, such as a contact making spring finger or spring clip 75 or the like, which depend from such busses into circuit making engagement with mating busses or circuit components 77 mounted by suitable means to base casing member 23 when the base and intermediate casing members 23, 25 are assembled together. Busses 73, spring fingers 75 thereof and mating busses 77 generally comprise spring clip terminals indicated generally at 79.

Summarizing at least in part with respect to the foregoing and referring again in general to the drawings, thermostat 11 is provided with an electrical circuit 81 (as discussed in detail hereinafter with respect to FIG. 6) and a pair of casing members, such as base and intermediate casing members 23, 25, adapted for assembly into releasable mounting engagement with each other (FIG. 1). Circuit 81 has at least a pair of components, such as busses 73, 77, predeterminately disposed on base and intermediate casing members 23, 25, and at least one resilient means, such as contact making spring finger 75, integral with buss 73 and adapted for biasing engagement in circuit relation with buss 77 upon the assembly of the casing members into releasable mounting engagement with each other (FIGS. 1 and 5). Casing members 23, 25 include means, such as guide apertures 51 and bosses 53, for guiding association with each other to insure assembly movement of the casing members generally only in one and other opposite directions, i.e. generally normally or perpendicular with respect to the generally planar faces of the casing members, during the assembly of the casing members into releasable mounting engagement with each other (FIGS. 1 and 4). Of course, the aforementioned insured assembly movement only in the one and opposite direction of casing members 23, 25 not only affords the proper alignment of circuit components 73, 77 but also obviates the possibility of distorting or breaking spring finger 75 as it is moved into assembly or circuit making engagement with circuit component 77 so as to positively insure the contact making therebetween when casing members 23, 25 are assembled together.

Referring now to FIG. 6 and recapitulating at least in part with respect to the foregoing, thermostat 11 in one form of the invention is provided for regulating the temperature of the given space and includes electrical circuit 81 having a heating branch or circuit 83 and a cooling branch 85 for supplying anticipation heat during the selective energization of the heating branch and the cooling branch, respectively, and means, such as resistor 15, is connected in the heating branch for generating the biasing heat when heating circuit 83 is selectively energized.

More particularly, means, such as a slide switch 87 or the like, is selectively manually movable for enabling heating branch 83 and cooling branch 85 which, in effect, conditions thermostat 11 for the heating mode and cooling mode operation thereof, respectively, and while the slide switch is illustrated for purposes of disclosure, it is contemplated that other types of switches may be utilized within the scope of the invention so as to meet the objects and advantageous features thereof. Enabling means or slide switch 87 is manually operable to enable heating branch 83 when a pair of mechanically linked contact bars 89, 91 make with contacts 93, 95 and 97, 99, respectively, of slide switch 87. Other contacts 101, 103 and 105, 107 of slide switch 87 are provided in cooling branch 85 for the enabling thereof when contact bars 89, 91 are respectively made with these contacts. Of course, when contact bars 89, 91 are made with contacts 95, 101 and 99, 105 of slide switch 87, the slide switch is in its "off" position so that neither heating branch 83 nor cooling branch 85 is enabled. As may be recalled, mercury switches 63, 65 are actuated to their respective switch points by the expansion and contraction of bimetal element 13 in response to not only the temperature of the given space but also the anticipation heat supplied thereto by resistors 17, 19 as well as the heat generated by the operation of the mercury switches. However, in order to simplify the schematic showing in FIG. 6, single pole, single throw mercury switch 63 is illustrated as a conventional blade 109 having an associated contact 111, and single pole, double throw mercury switch 65 is illustrated as a conventional blade 113 movable between a cooling contact 115 and a heating contact 117. It may be noted that resistor 17 is connected in cooling branch 85 in shunt circuit relation with mercury switch 65 and that resistor 19 is connected in heating branch 83 in parallel circuit relation with mercury switch 65, as discussed further hereinafter.

Assuming that selector arm 31 has been moved to its set-point temperature indicating the preselected temperature so as to effect the conjoint movement therewith of bimetal element 13 to its adjusted position, as previously described, cooling branch 85 may be enabled by moving slide switch 87 to its cooling position with contact bars 89, 91 engaging contacts 101, 103 and 105, 107 respectively, of the slide switch. With slide switch 87 so enabling cooling branch 85, power may flow therethrough from a thermostat terminal R through one blade 119 of a double pole, double throw switch 121 (in its position shown in FIG. 6), contacts 105, 107 and bar 91 of slide switch 87 to resistor 17 effecting its energization so as to create the anticipation heat which is, as previously discussed, transmitted to bimetal element 13. However, since resistor 17 has a rather large ohmic value, it effectively limits power flow therethrough to another blade 123 of double switch 121 and thermostat terminal Y. The anticipation heat generated by resistor 17 upon its energization in cooling branch 85 and the temperature of the space respectively acting on bimetal 13 causes it to expand in its adjusted position so as to move blade 113 into making engagement with cooling contact 115, and in this manner the resistor is shunted in the cooling branch. Of course, upon this shunting of resistor 17, it is deenergized thereby to impare its transmission of anticipation heat to bimetal element 13, and when blade 113 so engages cooling contact 115, cooling branch 85 is completed so that power flows through switch 65 and blade 123 of double switch 121 to thermostat terminal Y. Upon the completion of cooling branch 85, the air in the given space is conditioned by a system associated therewith, as discussed hereinafter, so as to reduce the temperature of the given space to the preselected value therefor. Thus, the reduced temperature of the given space acts on bimetal element 13 causing it to contract in its adjusted position whereby blade 113 of switch 65 is moved so as to break from cooling contact 115 and again interrupt the flow of power through cooling branch 85. When cooling branch 85 is so interrupted, the conditioning of the air in the given spaces is terminated which results in a temperature rise in the given space, and resistor 17 is again energized in the cooling branch so as to again transmit anticipation heat to bimetal element 13. The rising temperature of the given space and the anticipation heat of resistor 17 acting on bimetal 13 will cause it to again expand, as described above, so as to recycle switch 65 and again make or complete cooling branch 85. In this manner, the cycling of cooling branch 85 will continue so long as slide switch 85 enables the cooling branch to effect the cooling mode operation of thermostat 11.

In explanation of the purpose of heat anticipators, such as resistors 17, 19, if thermostat 11 would be allowed to respond only to the prevailing temperature of the given space in which the thermostat may be located, there would be overshoot in both the temperature increasing and temperature decreasing directions with respect to the selected temperature set by indicator arm 31 for the given space. In other words, if thermostat 11 was operable, i.e. set or adjusted, to turn off the cooling system when the temperature of the given space reached 70° F., by way of example, the temperature in the given space may actually be reduced to a value somewhat below 70° F. Of course, when the cooling system is off, the temperature of the given space may actually rise to a value somewhat above 70° F. before the thermostat functions to effect the actuation of the cooling system. The variance of temperatures with respect to the preselected temperature at which thermostat 11 is actually operable is generally referred to as an operating differential or room temperature swing. In order to maintain a low operating differential within acceptable limits or a generally small range, anticipators or resistors 17, 19 are provided to control cycle rate by preheating bimetal element 13 in the cooling mode operation and the heating mode operation of thermostat 11, respectively. Thus, bimetal element 13 will attain the set-point or preselected temperature so as to limit the overshooting effect and maintain the room or given space temperature differential acceptable limits. While the foregoing discussion concerns the anticipation heating of resistor 17 in cooling branch 85, resistor 19 is operable in heating branch 83 generally in the same manner.

If the operator desires to effect the heating mode operation of the thermostat 11 with the resulting heating of the given space, heating branch 83 may be enabled by moving slide switch 87 to its heating position with contact bars 89, 91 engaging contacts 93, 95 and 97, 99, respectively, of the slide switch. With slide switch 83 so enabling heating branch 83, assume that the temperature of the given space acting on bimetal element 13 causes it to contract in its adjusted position so as to move blade 113 of switch 65 into making engagement with heating contact 117 thereby to complete the heating branch. When heating branch 83 is so completed, power flows therethrough from thermostat terminal R through bar 91 and contacts 97, 99 of slide switch 87, blade 113 in making engagement with heating contact 117 of switch 65, and blade 123 of double switch 121 to thermostat terminal Y. The power will also flow in heating branch 83 through resistor 19 effecting its energization so as to generate the anticipation heat which is transmitted to bimetal element 13; however, since the resistor has a rather high ohmic value, it essentially limits power flow therethrough to contact 95 of slide switch 87. Upon the completion of heating branch 83, the air in the given space is heated by a system associated therewith, as discussed hereinafter, so as to increase the temperature of the given space to the preselected value therefor. Thus, the increased temperature of the given space and the anticipation heat of resistor 19 acts on bimetal element 13 causing it to expand in its adjusted position whereby blade 113 of switch 65 is moved so as to break from heating contact 117 and again interrupt the flow of power through heating branch 83. When heating branch 83 is so interrupted, heating of the given space is terminated which results in a temperature drop in the given space, and resistor 19 is again deenergized in the heating branch so as to terminate the transmission of anticipation heat to bimetal element 13. Thus, the reduced temperature of the given space acting on bimetal element 13 will cause it to again contract, as described above, so as to recycle switch 65 and again make or complete heating branch 83. In this manner, the cycling of heating branch 83 will continue so long as slide switch 87 enables the heating branch to effect the heating mode operation of thermostat 11.

A biasing circuit 125 is connected between a junction 127 in heating circuit 83 and a thermostat terminal T, and bias resistor 15 is connected in series circuit relation in the biasing circuit. As discussed in detail hereinafter, bias resistor 15 is effective upon the completion of biasing circuit 125 by slide switch 87 being in its heating position with bars 89, 91 engaged with contacts 93, 95 and 97, 99, respectively; and, the biasing circuit is energized so long as the slide switch is in its heating position and is also independent of the switching actions of blades 109, 113 of switches 63, 65, respectively. In this manner, the biasing heat supplied to bimetal element 13 by bias resistor 15 upon completion of biasing circuit 125 causes expansion of the bimetal element so as to effect the tripping of switches 63, 65 at a point predeterminately lower than the temperature of the space that the bimetal element is sensing.

In the event of the occurrence of a preselected condition such as may be encountered if the temperature of the space is reduced to a value predeterminately less than the preselected temperature value of the given space during the heating mode operation of thermostat 11, bimetal element 13 will contact in its adjusted position so as to initially effect the making of blade 113 with heating contact 117 of switch 65 completing heating circuit 83. Thereafter, further contraction of bimetal element 13 in response to the reduction of the temperature in the given space to the aforementioned value predeterminately less than the preselected temperature value for the given space effects movement of blade 109 of switch 63 into making engagement with contact 111 thereby to complete an auxiliary heating circuit from circuit junction 127 through blade 109 to a thermostat terminal W. As further discussed hereinafter, thermostat terminal W is adapted for connection with an auxiliary heating device, such as an electric heat source (not shown) for instance, which will provide auxiliary heat so as to supplement the heat provided by the heating device connected with thermostat terminal Y and controlled by operation of heating circuit 83. In this manner, when the auxiliary heat in the given space raises the temperature therein at least to the preselected value therefor, bimetal element 13 expands so as to actuate or move blade 109 to its position disengaged from contact 111 thereby to break or interrupt the auxiliary heating circuit which, of course, terminates the operation of the auxiliary heating device (not shown). Once the temperature of the given space is raised back to its preselected value and the auxiliary heating circuit is interrupted, as discussed above, thermostat 11 will cycle in its heating mode operation, as previously described; however, if the temperature of the given space subsequently decrease to the value predeterminately less than the preselected value therefore, then the thermostat will operate to again complete the auxiliary heating circuit.

Thermostat 11 is connected across a secondary coil 129 of a conventional step down type transformer 131 which has a primary coil 133 connected across a pair of line terminals L1, L2 so as to comprise a power source for the thermostat. Thermostat terminal R is connected with one side of the transformer secondary coils 129 while the other terminals of the thermostat are connected with the other side of the transformer secondary coil, as discussed below. The aforementioned system (not shown) associated with the given space for conditioning the temperature thereof may be for the purpose of this disclosure a conventional heat pump system. For instance, thermostat terminal Y is connected through a relay 135 for energizing a compressor of a heat pump (not shown) to transformer secondary coil 129. Another thermostat terminal O is connected to transformer secondary coil 129 through a relay 137 for operating a change over valve (not shown) which, when energized, controls or effects either the heating function of the heat pump or cooling function of the heat pump, and terminal O is also connected with contacts 93, 101 of slide switch 87. Thermostat terminal W is connected with transformer secondary coil 129 through a relay 139 for energizing the auxiliary heating device or source (not shown) associated with the given space. A thermostat terminal X2 is connected to transformer secondary coil 129 through a relay 141 for energizing an auxiliary heat source, such as another electric heat system (not shown) associated with the given space, and terminal X2 is also connected to an emergency heat contact 143 of double switch 121. Therefore, when blades 119, 123 of double switch 121 are thrown so that the blades are in positions opposite to that shown in FIG. 6, power flows from thermostat terminal R through blade 119 to energize a warning or emergency heat light 145 and therefrom to another thermostat terminal B which is connected to transformer secondary coil 129. Furthermore, when blade 123 of double switch 121 is made with emergency heat contact 143 and thermostat 11 is operating in its heating mode, then relay 141 will be energized through heating branch 83 to initiate the operation of the auxiliary heat source (not shown) whenever bimetal element 13 is operative to effect the completion of the heating branch, as previously discussed.

Thermostat 11 is provided with single pole, double throw switch 47 having a switch blade 149 manually movable between a pair of contacts 151, 153. Contact 151 is connected in circuit relation with blade 123 of double switch 121, and contact 153 is connected with thermostat terminal R. Blade 149 of switch 147 is connected with still another thermostat terminal G which is, in turn, connected with transformer secondary coil 129 through a relay 155 for energizing a fan motor (not shown) adapted to blow air over the heat exchanging coils (not shown) of the heat pump. When blade 149 of switch 147 is engaged with contact 151 thereof (as seen in FIG. 6), relay 155 will be energized only upon the completion of heating branch 83 and cooling branch 85 by the operation of bimetal element 13 when thermostat 11 is operating in its heating mode and cooling mode, respectively, as previously described. However, when blade 149 of switch 147 is moved into making engagement with contact 153 thereof, relay 145 will be continuously energized with power flowing from thermostat terminal R through switch 147 and thermostat terminal G to the relay.

Figure 7:
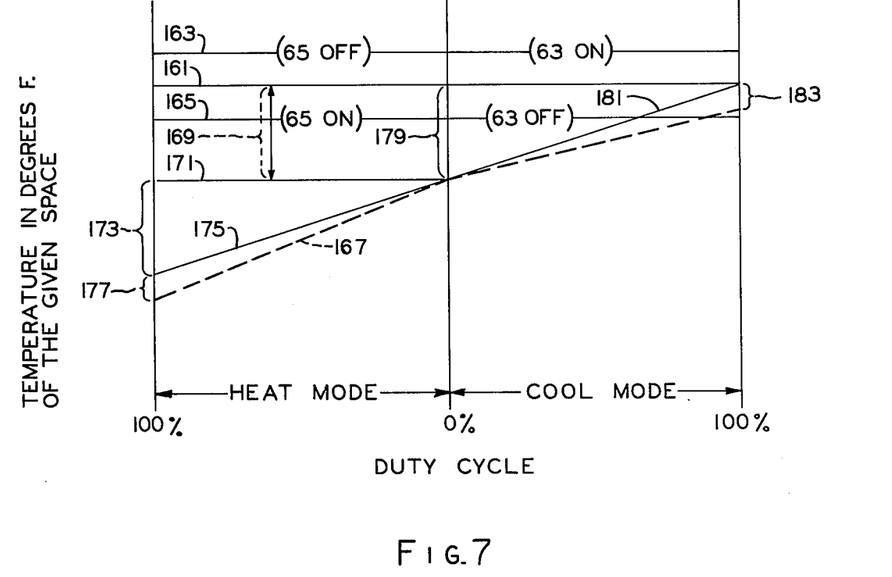
FIG. 7 is a graphical representation illustrating the heating mode operation and the cooling mode operation of a heating and cooling system controlled by the thermostat of FIG. 1.

Referring now to FIG. 7 in order to more clearly discuss the operation of thermostat 11 in controlling the heat mode and cool mode of the heat pump system (not shown) associated therewith, the abscissa of the graph of FIG. 7 represents the duty cycle of a heat pump in its heat mode and cool mode operations, and the ordinate of such graph represents the temperature in degrees F. of the given space which the heat pump is conditioning and in which the thermostat is located.

Horizontal line 161 represents the preselected or set point temperature of thermostat 11 at which the operator has moved temperature setting indicator or selector arm 31, as previously described, and horizontal lines 163, 165 which are respectively spaced above and below set point temperature line 161, represent the temperatures at which mercury switch 65 trips or operates so as to control cooling and heating circuits 83, 85 of the electrical circuit 81 in thermostat 11, as previously described. Dotted line 167 represents the temperature of the given space during the heating mode and cooling mode operation of the heat pump system through its heating duty cycle (0% – 100% on the graph abscissa) and its cooling duty cycle (0% – 100% on the graph abscissa).

From the graphical representation of FIG. 7., it may be seen that a bias temperature differential or off-set 169 is provided between set point temperature line 161 and a horizontal bias line 171, and bias temperature differential 169 is due to the bias heat transmitted by bias resistor 15 to bimetal element 13 during the heating mode operation, as previously described. Another temperature differential or droop 173 is illustrated through the heat mode duty cycle between horizontal bias line 171 and sloped heat anticipator line 175, and droop 173 is due to the anticipatory heat transmitted by anticipation resistor 19 to bimetal element 13 during the heating mode operation. Still another temperature differential or droop 177 exists between heat anticipator line 175 and space temperature line 167, and droop 177 is attributable to the heat transmitted by mercury switch 65 to bimetal element 13 during the heating mode operation.

With respect to the cooling mode duty cycle (0% – 100% on the graph abscissa), it may be noted that a temperature differential or droop 179 is illustrated between horizontal set point temperature line 161 and a sloped heat anticipator line 181, and droop 179 is occasioned due to the anticipatory heat transmitted by cooling resistor 17 to bimetal element 13 during the cooling mode operation. Still another temperature differential or negative droop 183 is shown between heat anticipator line 181 and space temperature line 167, and this negative droop 183 is caused by the heat transmitted by mercury switch 63 to bimetal element 13 during the cooling mode operation.

In view of the foregoing, it may be noted that the cycle rate of thermostat 11 during the heat mode operation is determined by the "on-to-off" differential of mercury switch 65 and the heat of mercury switch 65 and resistor 19; therefore, heating values of the switch and resistor are selected to afford a desired or optimum cycle rate for the thermostat during the heat mode operation. Since the cycle rate in the cool mode operation of thermostat 11 is determined by the "off-to-on" differential of mercury switch 65 (which is the same as mercury switch 65 in the heat mode operation), the heating values of mercury switch 65 and resistor 17 at any one duty cycle, such as a 50% duty cycle for instance, are made generally equal to those of mercury switch 65 and resistor 19. It may also be noted that bias resistor 15 lowers the control point (as illustrated by bias differential 169) so that the control point of temperature of the given space (as illustrated by line 167) gradually increases as the duty cycle progresses from 100% heat mode to 100% cool mode thereby to obviate any sharp changes as thermostat 11 changes from the heat mode to the cool mode operation. As previously mentioned, cycle rate affects the working or duty life of valuable components, such as the heat pump compressor for instance, in the heat pump system (not shown) controlled by thermostat 11; therefore, it is believed that the optimizing of both the heating and cooling cycle rates, as set forth above, is effective to maximize the working life of such heat pump system components.

From the foregoing, it is now apparent that a novel thermostat 11, method of operating such, electrical circuit and method of heating a temperature sensing means are presented meeting the objects and advantages therefor set out hereinbefore and that changes as to the precise arrangements, shapes, details and connections of the constructions, as well as the precise order of the method steps, illustrated herein by way of example, may be made by those having ordinary skill in the art without departing from the spirit of the invention or the scope thereof as defined by the claims which follow.

What I claim as new and desire to secure by Letters Patent of the United States is:

1. A thermostat for regulating the temperature of a space in which the thermostat may be located comprising:
   (a) a heating circuit;
   (b) a cooling circuit;
   (c) a post rotatably mounted in the thermostat;
   (d) a bimetal element movable between selected positions in the thermostat and operable for sensing the temperature of the space, said bimetal element having a generally spiral configuration with a pair of radially inner and outer ends, said inner end being mounted to said post so that said bimetal element is conjointly rotatable with said post;
   (e) a pair of switches, one of said switches being connected in both said cooling circuit and said heating circuit and adapted for switching operation therein at a pair of predetermined switch points and the other of said switches being connected in said heating circuit and adapted for switching operation therein at a predetermined switch point different than the switch points of said one switch;
   (f) a bracket mounted to said bimetal element adjacent said outer end so as to be conjointly movable with said bimetal element and for supporting said switches, said bracket including means for establishing the predetermined switch points of said switches;
   (g) a temperature selector manually movable within a predetermined range of temperature settings so as to set a preselected temperature of the space and drivingly associated with said post, said post being rotated so as to conjointly move said bimetal element to a respective one of its selected positions upon the manual movement of said temperature selector to set the preselected temperature;
   (h) means manually operable for selectively enabling said heating circuit and said cooling circuit;
   (i) a first resistor in said cooling circuit connected in shunt circuit relation with said one switch and energized when said cooling circuit is selectively enabled by said enabling means, said bimetal element in its respective one selected position being responsive to the sensed temperature and the anticipation heat supplied by said first resistor upon its energization to actuate said one switch to one of its predetermined switch points thereby to complete said cooling circuit and shunt said first resistor effecting its deenergization in the cooling circuit;
   (j) a second resistor connected in said heating circuit and adapted for energization to supply anticipation heat to said bimetal element, said bimetal element in its respective one selected position being initially responsive to the sensed temperature to actuate said one switch to the other of its predetermined switch points thereby to complete said heating circuit and effect the energization of said second resistor to supply its anticipation heat to said bimetal element when said heating circuit is selectively enabled by said enabling means; and
   (k) a third resistor connected in said heating circuit and adapted for energization to supply biasing heat to said bimetal element upon the enablement of said heating circuit by said enabling means.

2. A thermostat adapted for operation in a heating mode and a cooling mode so as to regulate the temperature of a space in which the thermostat may be located comprising:
   (a) means adjustably movable in the thermostat toward selected positions respectively indicative of a selected temperature of the space and operable in the selected positions for sensing the temperature of the space;
   (b) a pair of means disposed in heat transfer relation with said sensing means and energized during the heating mode operation and the cooling mode operation of the thermostat for supplying anticipation heat to said sensing means, respectively; and
   (c) means disposed in heat transfer relation with said sensing means and energized continuously during the heating mode operation of the thermostat for transferring biasing heat to said sensing means so as to supplement the anticipation heat supplied to said sensing means by one of said supplying means upon the energization thereof during the heating mode operation of the thermostat.

3. A thermostat as set forth in claim 2 further comprising means manually operable for selectively enabling the heating mode operation and the cooling mode operation of the thermostat.

4. A thermostat as set forth in claim 2 further comprising means manually movable in the thermostat for setting the selected temperature of the space and associated with said sensing means so as to effect the adjustable movement thereof to a respective one of the selected positions indicative of the selected temperature of the space set by said setting means upon the manual movement thereof.

5. A thermostat as set forth in claim 2 wherein said sensing means is movable in respective ones of the selected positions thereof in response to the sensed temperature of the space, and further comprising switch means associated with said sensing means and operable in response to the temperature sensing responsive movement of said sensing means for effecting the energization of said supplying means during the heating mode operation and the cooling mode operation of the thermostat, respectively.

6. A thermostat as set forth in claim 5 further comprising means for electrically connecting said switch means in shunt circuit relation with the other of said supplying means so as to effect its deenergization when said sensing means senses a temperature of the space approximating the selected temperature during the cooling mode operation of the thermostat and for connecting said switch means in circuit relation with said one supplying means so as to effect its energization when said sensing means senses a temperature of the space predeterminately less than the selected temperature during the heating mode operation of the thermostat.

7. A thermostat as set forth in claim 2 wherein said sensing means is movable in respective ones of the selected positions thereof in response to the sensed temperature of the space, and further comprising switch means associated with said sensing means and operable generally to the event of the occurrence of a preselected condition to effect a supply of auxiliary heat to the space during the heating mode operation of the thermostat.

8. A thermostat as set forth in claim 2 further comprising means for continuously connecting said transferring means in circuit relation with said one supplying means during the heating mode operation of the thermostat.

9. A thermostat for regulating the temperature of a space in which the thermostat may be located comprising:
(a) an electrical circuit having a heating branch and a cooling branch adapted for selective energization;
(b) a pair of means connected in said heating branch and said cooling branch for supplying anticipation heat during the selective energization of said heating branch and said cooling branch, respectively; and
(c) means associated with said heating branch for generating biasing heat continuously during the selective energization of said heating branch.

10. A thermostat as set forth in claim 9 further comprising means for selectively enabling said heating branch and said cooling branch.

11. A thermostat as set forth in claim 11 further comprising means for connecting one of said supplying means in circuit relation with said enabling means so as to be energized upon the selective enablement of said cooling branch by said enabling means.

12. A thermostat as set forth in claim 9 further comprising temperature sensing means movable in said thermostat in response to the temperature of the space including switch means operable generally between a pair of predetermined positions for controlling the energization and deenergization of said heating branch and said cooling branch, respectively.

13. A thermostat as set forth in claim 12 further comprising means for connecting said switch means in shunt circuit relation with one of said supplying means so as to effect its deenergization when said switch means is in one of its predetermined positions to effect the energization of said cooling branch.

14. A thermostat as set forth in claim 12 further comprising means for connecting said switch means in parallel circuit relation with one of said supplying means so as to effect its energization when said switch means is in one of its predetermined positions to effect the energization of said heating branch.

15. A thermostat as set forth in claim 9 further comprising an auxiliary heating branch connected in circuit relation in said electrical circuit with said heating branch, and said auxiliary heating branch including means operable generally in the event of the occurrence of a preselected condition for effecting the energization of said auxiliary heating branch during the selective energization of said heating branch.

16. A thermostat as set forth in claim 2 wherein said supplying means respectively comprise electrical resistors having generally the same ohmic values.

17. In a thermostat adapted for operation in a heating mode and a cooling mode and having means for sensing the temperature of a given space in which the thermostat may be located, a method of heating the temperature sensing means comprising the steps of:
(a) supplying anticipation heat from separate sources thereof to the temperature sensing means during the heating mode operation and the cooling mode operation of the thermostat, respectively; and
(b) generating a biasing heat from another source thereof continuously to the temperature sensing means during the heating mode operation of the thermostat.

18. The method as set forth in claim 17 comprising the preliminary step of enabling the thermostat to selectively effect one of the heating mode operation and the cooling mode operation of the thermostat.

19. The method as set forth in claim 17 wherein the supplying step comprises energizing a pair of means for supplying the anticipation heat during the heating mode operation and the cooling mode operation of the thermostat, respectively.

20. The method as set forth in claim 17 wherein the generating step comprises energizing a means for continuously transferring the biasing heat to the temperature sensing means during the heating mode operation of the thermostat.

21. A method of operating a thermostat having a heating circuit and a cooling circuit and also having means for sensing the temperature of a given space in which the thermostat may be located, the method comprising the steps of:
(a) enabling one of the heating circuit and the cooling circuit;
(b) energizing a pair of means in the heating circuit and the cooling circuit for supplying anticipation heat to the temperature sensing means upon the enablement of one of the heating circuit and the cooling circuit respectively; and
(c) energizing a means generally simultaneously with the energization of one of the supplying means in the heating circuit for continuously generating a biasing heat supplemental to the anticipation heat supplied to the temperature sensing means by the one supplying means and when the heating circuit is enabled.

22. The method as set forth in claim 21 wherein the energizing step comprises completing the cooling circuit through the other of the supplying means upon the enablement of the cooling circuit.

23. The method as set forth in claim 22 wherein the temperature sensing means includes a switch device connected in the cooling cicuit in shunt circuit relation with the other supplying means, and wherein the energizing step further comprises actuating the temperature sensing means in response to the occurrence of a preselected temperature in the given space so that the cooling circuit is completed through the switch device and the other supplying means is shunted when the cooling circuit is enabled.

24. The method as set forth in claim 21 comprising the additional step of switching an auxiliary heating circuit in circuit relation with the heating circuit in the event of the occurrence of a preselected condition.

25. An electrical circuit for a thermostat having temperature sensing means movable therein in response to a sensed temperature of a given space in which the thermostat may be located, the electrical circuit comprising:
(a) a heating branch circuit and a cooling branch circuit adapted for selective enablement;
(b) switch means operable generally in response to the movement of the temperature sensing means between circuit making and circuit breaking positions for controlling said heating branch circuit and said cooling branch circuit upon the selective enablement thereof;
(c) means connected in said cooling branch circuit in shunt circuit relation with said switch means for supplying anticipation heat to the temperature sensing means when said switch means is in its circuit breaking position and said cooling branch circuit is selectively enabled;

(d) another means connected in said heating branch circuit for supplying anticipation heat to the temperature sensing means when said switch means is in its circuit making position and said heating branch circuit is enabled; and (e) means connected in said heating branch circuit for continuously transmitting biasing heat to the temperature sensing means upon the enablement of said heating branch circuit.

26. An electrical circuit as set forth in claim 25 further comprising other switch means operable generally in response to the movement of the temperature sensing means from a circuit breaking position to a circuit making position for energizing an auxiliary heat source when the heating branch circuit is enabled.

27. An electrical circuit for a thermostat having temperature sensing means movable therein in response to a sensed temperature of a given space in which the thermostat may be located, the electrical circuit comprising:

(a) a heating branch circuit and a cooling branch circuit adapted for selective enablement;

(b) a pair of means connected in said heating branch circuit and said cooling branch circuit for supplying anticipation heat to the temperature sensing means when said heating branch circuit and said cooling branch circuit are enabled, respectively; and (c) means connected in the heating branch circuit for continuously transmitting a biasing heat to the temperature sensing means upon the enablement of said heating branch circuit.

28. An electrical circuit as set forth in claim 27 further comprising switch means for controlling said heating branch circuit and said cooling branch circuit and adapted for actuation in response to the movement of the temperature sensing means.

29. An electrical circuit as set forth in claim 28 wherein said cooling branch circuit includes means for connecting one of said supplying means in said cooling branch circuit in shunt circuit relation with said switch means.

30. An electrical circuit as set forth in claim 28 further comprising an auxiliary heating branch circuit connected in circuit relation with said heating branch circuit, and switch means operatively associated with the temperature sensing means and actuated thereby toward a circuit completing position in said auxiliary heating branch circuit upon the occurrence of a preselected condition.

* * * * *

UNITED STATES PATENT AND TRADEMARK OFFICE
CERTIFICATE OF CORRECTION

PATENT NO. : 4,114,681
DATED : September 19, 1978
INVENTOR(S) : Dann W. Denny

It is certified that error appears in the above-identified patent and that said Letters Patent are hereby corrected as shown below:

Col. 1, line 2, after "SUCH" insert --,--.
Col. 3, line 65, delete "the".
Col. 4, line 68, delete "radically" and insert --radially--.
Col. 5, line 30, delete "member" and insert --members--;
line 40, after "positions" insert --and is operable generally in the selected positions--.
Col. 6, line 33, delete "(G.E.)".
Col. 12, line 47, delete "of" and insert --or--.
Col. 16, line 25, after "of" (first occurrence) insert --the--.

Signed and Sealed this

Nineteenth Day of June 1979

[SEAL]

Attest:

RUTH C. MASON
Attesting Officer

DONALD W. BANNER
Commissioner of Patents and Trademarks